United States Patent
Houston et al.

(10) Patent No.: US 9,923,897 B2
(45) Date of Patent: Mar. 20, 2018

(54) EDGE SERVER SELECTION FOR ENHANCED SERVICES NETWORK

(71) Applicant: SURFEASY, INC., Toronto (CA)

(72) Inventors: Chris Houston, Toronto (CA); Athir Nuaimi, Toronto (CA); Josh Gross, Toronto (CA)

(73) Assignee: SURFEASY, INC., Toronto (CA)

( * ) Notice: Subject to any disclaimer, the term of this patent is extended or adjusted under 35 U.S.C. 154(b) by 86 days.

(21) Appl. No.: 14/199,035

(22) Filed: Mar. 6, 2014

(65) Prior Publication Data

US 2014/0259109 A1  Sep. 11, 2014

Related U.S. Application Data

(60) Provisional application No. 61/773,351, filed on Mar. 6, 2013, provisional application No. 61/781,415, filed on Mar. 14, 2013.

(51) Int. Cl.
*H04L 29/06* (2006.01)
*H04L 9/00* (2006.01)
(Continued)

(52) U.S. Cl.
CPC ............ *H04L 63/10* (2013.01); *H04L 63/08* (2013.01); *G06F 15/17* (2013.01); *H04L 9/00* (2013.01);
(Continued)

(58) Field of Classification Search
CPC ................... H04L 12/4641; H04L 63/0272
See application file for complete search history.

(56) References Cited

U.S. PATENT DOCUMENTS 5,961,593 A * 10/1999 Gabber ............... G01M 13/021
                                                    370/329
6,442,687 B1    8/2002 Savage
(Continued)

OTHER PUBLICATIONS

E. Rosen and Y. Rekhter, Network Working Group Request for Comments: 2547, BGP/MPLS VPNs, Mar. 1999, The Internet Society, pp. 1-8 and 16-23.*

*Primary Examiner* — Carl Colin
*Assistant Examiner* — Gary Lavelle
(74) *Attorney, Agent, or Firm* — Alleman Hall Creasman & Tuttle LLP

(57) ABSTRACT

An enhanced services network provides enhanced privacy and/or security over public networks to client subscribers of the service. Client devices access the enhanced services network over a public communications network (e.g., the Internet, cellular network, etc.) via a client-side edge server of the enhanced services network. The enhanced services network interfaces with client-requested network resources hosted by third-party server devices via a resource-side edge server. The particular client-side edge server and/or resource-side edge server that is utilized for a particular client session may be selected by the enhanced services network according to a rule set. The rule set may seek to achieve one or more target goals, such as: (1) limit discoverability of the enhanced services network, (2) minimize or reduce geographic/network distance between an edge server and a target computing device, and/or (3) establish connections that are more secure than the connections originally requested by the client.

16 Claims, 6 Drawing Sheets

(51) Int. Cl.
 *H04L 12/28* (2006.01)
 *H04L 12/54* (2013.01)
 *G06F 15/17* (2006.01)

(52) U.S. Cl.
 CPC .............. *H04L 12/28* (2013.01); *H04L 12/56* (2013.01); *H04L 29/06* (2013.01)

(56) References Cited

U.S. PATENT DOCUMENTS

| | | | |
|---|---|---|---|
| 8,776,209 B1* | 7/2014 | Kumar | H04L 63/0272 380/270 |
| 2002/0026503 A1* | 2/2002 | Bendinelli | H04L 12/2602 709/220 |
| 2002/0055989 A1* | 5/2002 | Stringer-Calvert | H04L 12/24 709/220 |
| 2004/0168051 A1* | 8/2004 | Guo | H04L 12/4641 713/153 |
| 2004/0213228 A1* | 10/2004 | Tingle | H04L 12/462 370/389 |
| 2005/0063411 A1* | 3/2005 | Wang | H04L 12/4608 370/437 |
| 2005/0193103 A1* | 9/2005 | Drabik | H04L 63/0272 709/221 |
| 2008/0151748 A1* | 6/2008 | Virgilio | H04L 12/2854 370/229 |
| 2009/0031415 A1* | 1/2009 | Aldridge | H04L 63/0272 726/15 |
| 2010/0218248 A1* | 8/2010 | Nice | H04L 63/0272 726/12 |
| 2011/0225286 A1* | 9/2011 | Francis | H04L 63/0272 709/224 |
| 2012/0201124 A1* | 8/2012 | Marques | H04L 45/28 370/221 |
| 2013/0205025 A1* | 8/2013 | Shamsee | H04L 63/0272 709/225 |

\* cited by examiner

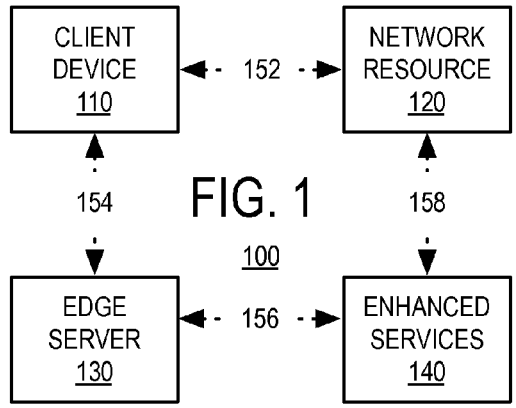
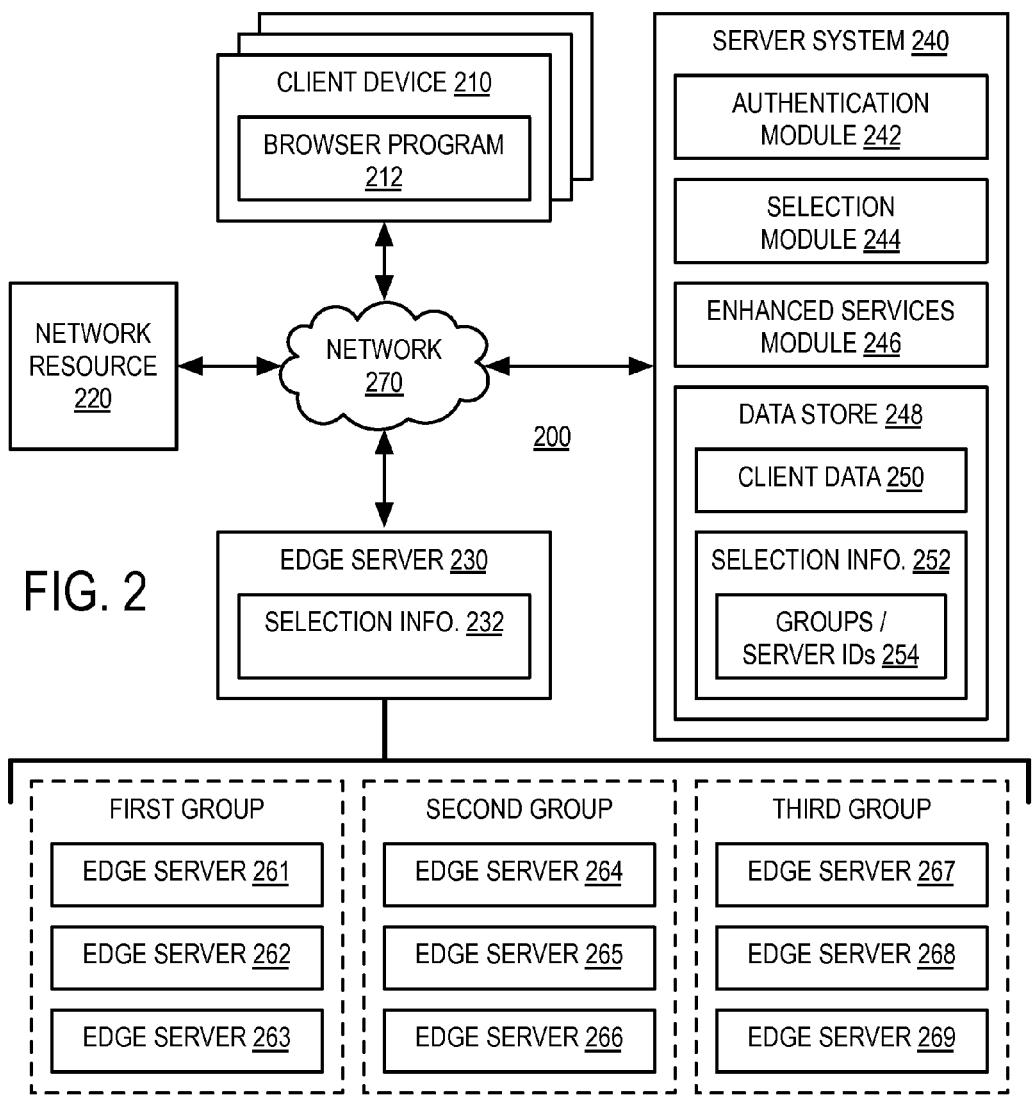

EDGE SERVER SELECTION FOR ENHANCED SERVICES NETWORK

CROSS REFERENCE TO RELATED APPLICATIONS

This application claims priority to U.S. Provisional Application Ser. No. 61/773,351, filed Mar. 6, 2013, the entirety of which is hereby incorporated herein by reference. This application also claims priority to U.S. Provisional Application Ser. No. 61/781,415, filed Mar. 14, 2013, the entirety of which is hereby incorporated herein by reference.

BACKGROUND

Within computing systems, clients and servers communicate with each other over a communications network, which may include the Internet, one or more cellular networks that provide wireless connectivity to the Internet, and other access networks. Communications transmitted over a network may traverse intermediate networking equipment owned or operated by various third-party entities. Network communications may be encrypted to increase the security and privacy of information contained within the communications.

SUMMARY

An enhanced services network provides enhanced privacy and/or security over public networks to client subscribers of the service. Client devices access the enhanced services network over a public communications network (e.g., the Internet, cellular network, etc.) via a client-side edge server of the enhanced services network. The enhanced services network interfaces with client-requested network resources hosted by third-party server devices via a resource-side edge server. The particular client-side edge server and/or resource-side edge server that is utilized for a particular client session may be selected by the enhanced services network according to a rule set. The rule set may seek to achieve one or more target goals, such as: (1) limit discoverability of the enhanced services network, (2) minimize or reduce geographic and/or network distance between an edge server and a target computing device, and/or (3) establish connections that are more secure than the connections originally requested by the client.

It will be appreciated that this Summary describes only some of the concepts covered in greater detail by the following detailed description and associated drawings. As such, claimed subject matter is not limited to the contents of this Summary.

BRIEF DESCRIPTION OF DRAWINGS

FIG. 1 is a schematic diagram depicting a first view of an example computing system.

FIG. 2 is a schematic diagram depicting a second view of an example computing system.

DETAILED DESCRIPTION

Figure 3:
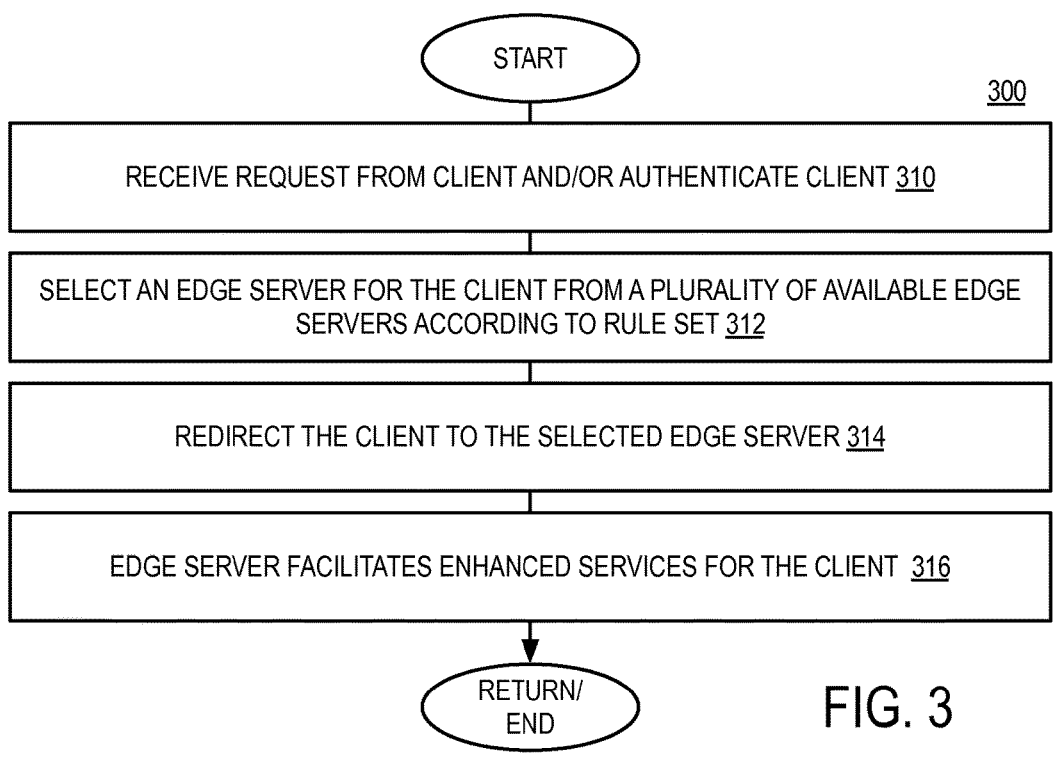
FIG. 3 is a flow diagram depicting a first example method.

An enhanced services network is disclosed. The enhanced services network may take the form of a privacy service that provides enhanced privacy and/or security over public networks to client subscribers of the service. Client devices may access the enhanced services network over a public communications network (e.g., the Internet, cellular network, etc.) via an edge server of the enhanced services network. A particular edge server through which a client device accesses the enhanced services network may be selected from a plurality of available edge servers.

In an example embodiment, edge servers may be selected according to a rule set that limits discoverability of an enhanced services network. Discoverability within this context may refer to the ability for an individual, a group of individuals, or other entity to discover that a particular edge server or group of edge servers form part of the enhanced services network, or the ability to discover the enhanced services network's entire domain of edge servers. For example, a rule set may limit a quantity or proportion of the available edge servers that are selected or otherwise available for use by a particular client device or a group of associated client devices, over one or more sessions. In at least some implementations, edge server selection may be performed by a selection module of the enhanced services network in which individual client devices are redirected to selected edge servers by the selection module.

In another example embodiment, a resource-side edge server forming an edge of an enhanced services network is selected by a coordinating server of the enhanced services network. Selection of the resource-side edge server from a plurality of available edge servers may seek to minimize or reduce a geographic and/or network distance between the resource-side edge server and a server hosting a network resource. Selection of edge servers may be in accordance with a rule set applied by the enhanced services network.

In yet another example embodiment, redirection of client requests by a resource-side edge server to a more secure connection type is disclosed. A resource-side edge server receives a request for a network resource originating from a client device. The resource-side edge server judges whether a server system hosting the network resource supports a more secure connection type than requested by the client device. If the more secure connection type is supported by the server system, the resource-side edge server establishes a connection of the more secure connection type, and facilitates communications between the server system and the client device over the more secure connection.

The following disclosure provides several examples of how a rule set may be implemented to achieve one or more target goals, including: (1) limit discoverability of the enhanced services network, (2) minimize or reduce a geographic and/or network distance between an edge server and a target computing device, such as a client device or a server hosting a network resource, and/or (3) establish connections or communications sessions that are more secure than the connections or sessions originally requested by a client device. A rule set implemented by an enhanced services network may prioritize, balance, or utilize some or all of these target goals to provide an integrated enhanced services experience to its clients. The particular target goals that are implemented by the enhanced services network and/or the prioritization and/or balancing of these target goals may be defined, at least in part, by a client user, an administrator of the enhanced services network, and/or other suitable entity.

Edge server selection may be performed by a selection module of the enhanced services network that implements the rule set. The selection module may reside at a coordinating server, or multiple instances may be deployed to a plurality of servers, including edge servers, for example. In one example, the rule set may limit a quantity or proportion of the available edge servers (e.g., client-side edge servers and/or resource-side edge servers) that are selected or otherwise available for use by a particular client device or a group of associated client devices. Individual client devices may be redirected to selected edge servers by the selection module of the enhanced services network. Here, the rule set limits or reduces discoverability of edge servers of the enhanced services network.

The uncoordinated selection and/or use of edge servers for client access to an enhanced services network may enable an undesired level of discovery of the various network devices that form the enhanced services network or otherwise permit client entities or third-party entities to reverse engineer aspects of the enhanced services network. For example, in the context of edge servers that serve as proxy servers or provide a proxy server function, an unrestrained and broad discovery of the edge servers may be used by network administrators and operators of intermediate network components and/or network resources to: (1) block client devices from accessing the edge servers over their network components and/or block client devices from accessing their network resources; (2) provide reduced quality of service over their intermediate network components and/or by their network resources; and (3) publish a list or blacklist of the discovered edge servers which may be used by other entities associated with intermediate network components and/or network resources to block or reduce the quality of service for client devices connecting to or attempting to connect to the discovered edge servers. Accordingly, the methods, processes, and techniques disclosed herein for limiting the discovery of edge servers of an enhanced services network may reduce the scope and/or severity of third-party interference with client access to the enhanced services and/or network resources that are accessed by client devices through the enhanced services network.

FIG. 1 is a schematic diagram depicting a view of an example computing system 100. Computing system 100 includes an example client device 110 that may communicate with other computing devices via a communications network. For example, client device 110 may access network resource 120 over the communications network, as indicated by communications 152. A network resource may include any suitable content item, collection of content items, service, collection of services, or other form of information having an identity. A network resource may be hosted by one or more server devices, or one or more client devices, and may be identified and addressable within computing system 100 by a uniform resource locator (URL), IP address, or other suitable identifier.

Communications 152 may traverse portions of a communications network, including a wired or wireless interface, a wired or wireless access point, a local area network (e.g., an intranet, a cellular edge network, etc.), and a wide area network (e.g., the Internet, a cellular backhaul and/or core network, etc.). As another example, client device 110 may access enhanced services 140 over the communications network via an edge server 130, as indicated by communications 154 and 156. Communications 154 and/or 156 may also traverse portions of the communications network.

In at least some implementations, edge server 130 and/or other network devices hosting aspects of enhanced services 140 may collectively form an enhanced services network (e.g., a privacy network) through which client device 110 may access third-party resources, such as previously discussed network resource 120. For example, client device 110 may direct a request for network resource 120 to edge server 130, which may process the request on behalf of client device 110 by directing communications to network resource 120 and/or to network devices hosting aspects of enhanced services 140.

Non-limiting examples of enhanced services 140 that may be provided by edge server 130 and/or other network devices hosting aspects of enhanced services 140 may include one or more of: (1) proxy services (e.g., anonymization) in which edge server 130 and/or other network devices terminate connections and establish new connections between the client device and third-party resources; (2) establishment of secure connections (e.g., VPN connections, encrypted connections, tunneled connections, etc.) between the client device and the edge server and/or other related network devices; (3) secure connection (e.g., SSL) redirection or establishment to higher security connections supported by third-party resources than the connections originally requested by the client device; (4) analysis and/or filtering of communications between the client device and third-party resources, including anti-virus, parental controls, etc.; (5) access to client profile information hosted by the enhanced services network that may be used to implement policy with respect to a particular user and/or client device across multiple sessions; and (6) client authentication, among other enhanced services.

FIG. 2 is a schematic diagram depicting a view of an example computing system 200. Computing system 200 of FIG. 2 may form a non-limiting example of previously described computing system 100 of FIG. 1.

In FIG. 2, client device 210 includes a browser program 212 which may be operated by a human user to access or otherwise interact with network resources, such as network resource 220 over network 270, for example. In one example, browser program 212 may include a general-purpose web browser. However, browser program 212 may refer to any suitable application program or operating system component that enables a client device to access or otherwise interact with network resources. For example, browser program 212 may instead take the form of a special-purpose application that interfaces with an application programming interface (API) of a coordinated service of a network resource.

As previously discussed with respect to computing system 100 of FIG. 1, a client device, such as client device 210, may access network resources via an edge server, such as edge server 230. FIG. 2 further depicts a plurality of client devices 211, which include example client device 210. It will be understood that computing system 100 may include hundreds, thousands, millions, billions, or more client devices.

FIG. 2 further depicts a server system 240 that cooperates with edge server 230 to provide enhanced services to client device 210. Server system 240 may take the form of a coordinating server system in some examples. Edge server 230 may be one of a plurality of edge servers distributed across a range of geographic and/or network locations, and/or that reside at the same or similar geographic and/or network location. An example plurality of edge servers is represented in FIG. 2 as edge servers 261-269. Edge servers 230, and 261-269, as well as server system 240 may collectively form an enhanced services network. The enhanced services network may be operated by a common entity or a group of associated entities, in contrast to network resource 220 and/or intermediate network devices (not shown) that may be operated by unrelated third-party entities. It will be understood that the enhanced services network may include any suitable number of edge servers, including tens, hundreds, thousands, millions, or more edge server devices.

Server system 240 may include one or more server devices that reside at the same or similar geographic and/or network location, and/or one or more server devices that are distributed across a range of geographic and/or network locations. The enhanced services network may include server system 240 and the edge servers disclosed herein, including edge servers 230, and 261-269. While server system 240 is depicted as a separate entity from one or more of the edge servers, in at least some implementations, server system 240 may be distributed across and may be formed exclusively by edge servers. In still other implementations, certain aspects of server system 240 described herein may reside at and/or may be distributed across edge servers, while other aspects of server system 240 reside at and/or may be distributed across server devices that do not serve as edge servers.

Server system 240 (and/or the edge servers) of the enhanced services network may execute instructions that define one or more modules. For example, server system 240 may include an authentication module 242 that authenticates client devices by receiving or otherwise exchanging authentication credentials from or with client devices over network 270. In one example, a human operator (i.e., user) of client device 210 may subscribe to the enhanced services network by establishing an account and/or by paying a subscription fee. Use of the enhanced services network or portions thereof may be limited to subscribers in some examples. Authentication of client devices may be used to limit use of the enhanced services network or portions thereof to users that have subscribed to the enhanced service network, to distinguish subscribers from non-subscribers, and to identify and distinguish client devices and/or their respective users from each other. Any suitable form of authentication and state maintenance of client devices across one or more sessions may be supported by the enhanced services network.

Server system 240 may include a selection module 244 that selects a particular edge server through which a client device connects to and accesses the enhanced services network. The selection module may additionally or alternatively select a particular edge server through which server devices hosting network resource requested by a client device connect to resource-side edge servers of the enhanced services network, as will be described in further detail with reference to FIGS. 4-6, for example.

Within FIG. 2, a client device may initially connect or attempt to connect to an unselected, inappropriate, or default edge server, or other server of the enhanced service network, including servers forming server system 240. The client device may be redirected to the selected edge server by the device to which the client device initially connected or attempted to connect. In some examples, selection module 244 may transmit redirection information to the client device or to another device of the enhanced services network to which the client device has initially connected or attempted to connect. The redirection information may be used to redirect the client device to the selected edge server.

Server system 240 may further include enhanced services module 246 that performs or otherwise supports one or more of the enhanced services described herein with respect to the enhanced services network. Server system 240 may further include a data store 248 in which client data 250 and/or selection information 252 may be stored and/or accessed. Client data 250 may include client profile or account information. Selection information 252 may include information defining or otherwise describing the various edge servers that are available to or that form part of the enhanced services network, their respective identifiers, geographic locations, network locations, and associations with one or more groups of edge servers.

FIG. 2 further depicts how edge servers may be associated with one or more groups of edge servers. As will be described in greater detail with reference to FIG. 3, edge server groupings may facilitate the selection and assignment of edge servers to client devices and/or client groups. For example, in FIG. 2, edge servers 261-263 form a first group, edge servers 264-266 form a second group, and edge servers 267-269 form a third group. Edge servers may be associated with one or more groups with respect to a particular client device or client group, or such groups may be global with respect to a client devices or client groups. The enhanced services network may include any suitable number of groups of edge servers, including two, three, four or more, tens, hundreds, thousands, millions, or more groups. Each group may include any suitable number of edge servers, including two, three four or more, tens, hundreds, thousands, millions, or more edge servers. In some examples, each edge server may be associated with a single group. In another example, one or more edge servers may be associated with two or more groups. Hence, groups of edges servers may be partially overlapping in terms of their edge server membership and/or may have edge servers that are exclusive to only that group.

FIG. 3 is a flow diagram depicting an example method 300 for a computing system. In at least some implementations, method 300 may be performed by an enhanced services network, such as previously described enhanced services networks of FIGS. 1 and 2. Aspects of method 300 may be performed by one or more edge servers of the enhanced services network and/or by a centralized or distributed server system, such as server system 240 of FIG. 2. In at least some implementations, method 300 of FIG. 3 may be performed for each client device that subscribes to the enhanced services network for each session initiated by the client device.

At 310, the method may include receiving a request from a client device and/or authenticating the client device over a communications network. In one example, the request may be received by authentication module 242 or forwarded to authentication module 242 by another device of the enhanced services network, such as an edge server. The client device may be authenticated by exchanging authentication information with the client device over the communications network, such as via an API, for example. A client device may be authenticated for one or more sessions based on authentication information received from or exchanged with the client device.

At 312, the method may include selecting an edge server for the client device from a plurality of available edge servers. The selection performed at 312 may be in accordance with a rule set. The rule set may be implemented at or by edge servers and/or a server system of the enhanced services network. The rule set may be defined, at least in part, by selection information 252 and/or 232 in FIG. 2, for example. Portions of selection information 252 residing in a data store at a coordinating server system, such as server system 240, may be deployed to edge servers in the form of selection information 232 at edge server 230 in FIG. 2. Client data may also be deployed to edge servers. Selection information 232 may enable edge server 230 to redirect client devices to other edge servers, which may include edge servers of a group with which edge server 230 is a member.

The selection module may transmit or otherwise output an identity of the selected edge server. A group of edge servers available to the client over the one or more sessions of a domain of edge servers may be maintained in a data store. The group of edge servers may be client-specific (i.e., for that client) and/or client-group-specific (i.e., for a group of associated clients). The group of edge servers may include and be limited to a predefined quantity (e.g., number value) and/or proportion (e.g., as a %) of the domain of edge servers.

In one example, a rule set employed by the enhanced services network for edge server selection may include: (1) a first rule that states that an individual client may not learn of or connect to more than the predefined quantity or proportion of a domain of available edge servers; and (2) a second rule that states that two or more clients within a given client-side subdomain (e.g., based on IP addresses, geo-location, etc.) will be given a diverse range of edge servers such that there is a minimum (e.g., predefined as a quantity or proportion) and/or maximum overlap (e.g., predefined as a quantity or proportion) among selected edge servers between two or more clients of that subdomain. These rules may be used in combination with each other. Selection can be based on a number of factors, including past edge server selection for that client or other clients of a client group, load on each edge server, the client's geographic proximity to the edge server, connection speed/latency of the network in relation to the client and the edge server, IP address of the client, etc.

At 314, the method may include redirecting the client device to the selected edge server. For example, the device to which the client device initially connected for purposes of authentication performed at 310, may be redirected to the selected edge server by that device responsive to the selection obtain at 312 from the selection module. The client device may transmit a new request for a network resource to the selected edge server, which may be received and processed by that edge server.

For example, responsive to a first authentication of the client for a session, a browser program of the client may be redirected from the initially connected device to a first edge server of a client-specific group of edge servers. The first edge server facilitates at least a portion of the session between the client and one or more network resources and/or enhanced services of the enhanced services network. Responsive to a second authentication of the client for a subsequent session, for example, the browser program of the client may be redirected from an initially connected device to a second edge server of the client-specific group of edge servers. The second edge server facilitates at least a portion of the subsequent session between the client and one or more network resources.

In another example, the client is redirected from the first edge server to the second edge server or alternatively to a third edge server of the client-specific group during a session. The second edge server or the third edge server may further facilitate the same session between the client and the one or more network resources. In at least some implementations, edge server transitions may be performed as the client device navigates to a different network resource, different web domain, or a subdomain within a particular web domain. In such case, the currently connected edge server may redirect the client device to another selected edge server.

The client may be a first client of a plurality of clients, and the client-specific group may be a first client-specific group of a plurality of client-specific groups of edge servers. A second client may be authenticated at the coordinating server for one or more sessions based on authentication information received from the second client via a browser program over the communications network. In one example, the first client and the second client are located within a geographic proximity to each other or each utilizes an IP address that is related within a subdomain of IP addresses. A second client-specific group of edge servers available to the second client over the one or more sessions of the domain of edge servers may be maintained in a data store of the enhanced service network. The second client-specific group of edge servers may include a predefined quantity or proportion of the domain of edge servers, and further may include one or more different edge servers than the first client-specific group.

Selection information transmitted from a selection module to the edge servers of a group may indicate a client identifier for the client, and may further indicate at least some edge servers of the group of edge servers for the client. The selection information enables the first edge server and the second edge server to redirect the client from one of the first edge server and the second edge server to another edge server of the client-specific group during a session.

Continuing with the above example, a third client may be authenticated at the coordinating server for one or more sessions based on authentication information received from the third client via a browser program over the communications network. A third client-specific group of edge servers available to the third client for one or more sessions of the domain of edge servers may be maintained in a data store of the enhanced services network. The third client-specific group of edge servers may include a predefined quantity or proportion of the domain of edge servers, and may further include one or more different edge servers than at least one of the first client-specific group and/or the second client-specific group.

The third-client specific group of edge servers may include the same edge servers as one of the first client-specific group or the second client specific group, for example, if the third client is located outside of the geographic proximity to one of the first client or second client or utilizes an IP address that is unrelated to the subdomain of IP addresses. As previously discussed, a domain of edge servers may be divided into three or more groups of edge servers, and the three or more groups of edge servers may each include one or more different edge servers relative to each other. Two or more groups of edge servers may each include one or more of the same edge servers relative to each other.

At 316, the method may include, at the selected edge server, facilitating enhanced services for the client device. For example, the edge server may direct client communications to a requested third-party network resource or to an entity of the enhanced services network, such as enhanced services module 246. As previously discussed, enhanced services may include proxy services, anonymization, establishment of secure connections, secure connection redirection to third-party resources, analysis and/or filtering of client communications, including anti-virus, parental controls, etc., access to client profile information hosted by the enhanced services network, client authentication, among other enhanced services.

Groupings of clients and/or edge servers may be adjusted or redistributed over time. In one example, edge servers may be added or removed from the enhanced services network as edge servers are blocked or blacklisted. Client devices formerly associated with a particular geographic region or IP address range may be relocated. In such case, the client devices may be dissociated from a group attributed to the geographic region or IP address range. In other examples, client device groupings may persist even in light of a change to the geographic location and/or IP address range of the client device.

Edge server selection for an enhanced services network is disclosed. In one example, a resource-side edge server forming an edge of the enhanced services network is selected by a coordinating server of the enhanced services network. Selection of the resource-side edge server may be in accordance with a rule set that includes one or more rules. An example rule of the rule set may seek to minimize or reduce a geographic distance and/or network distance between the resource-side edge server and a server system hosting an instance of the network resource. The network distance may be with reference to network latency, round-trip time, and/or the number of intermediate network devices between the resource-side edge server and a server hosting an instance of the network resource. Another example rule of the rule set may include limiting use and/or discoverability of the resource-side edge server with respect to one or more network entities, including a client, a domain of clients, server system hosting a network resource or a domain of network resources; and one or more performance criteria, such as server load at the resource-side edge server.

Redirection of client requests by a resource-side edge server to a more secure connection type is also disclosed. In one example, a resource-side edge server receives a request for a network resource originating from a client. The resource-side edge server judges whether a server system hosting the network resource supports a more secure connection type than requested by the client. If the more secure connection type is supported by the server system, the resource-side edge server establishes a connection of the more secure connection type, and facilitates communications between the client and the server system over the connection. The resource-side edge server may obtain an indication of whether a more secure connection type is supported by the server system from a coordinating server of the enhanced services network. Public, third-party, and/or proprietary directories may be referenced to determine whether a particular connection type is supported by a server system hosting a particular network resource. Testing of the server system hosting the network resource may be used to determine whether a connection type is supported by the server system.

Figure 4:
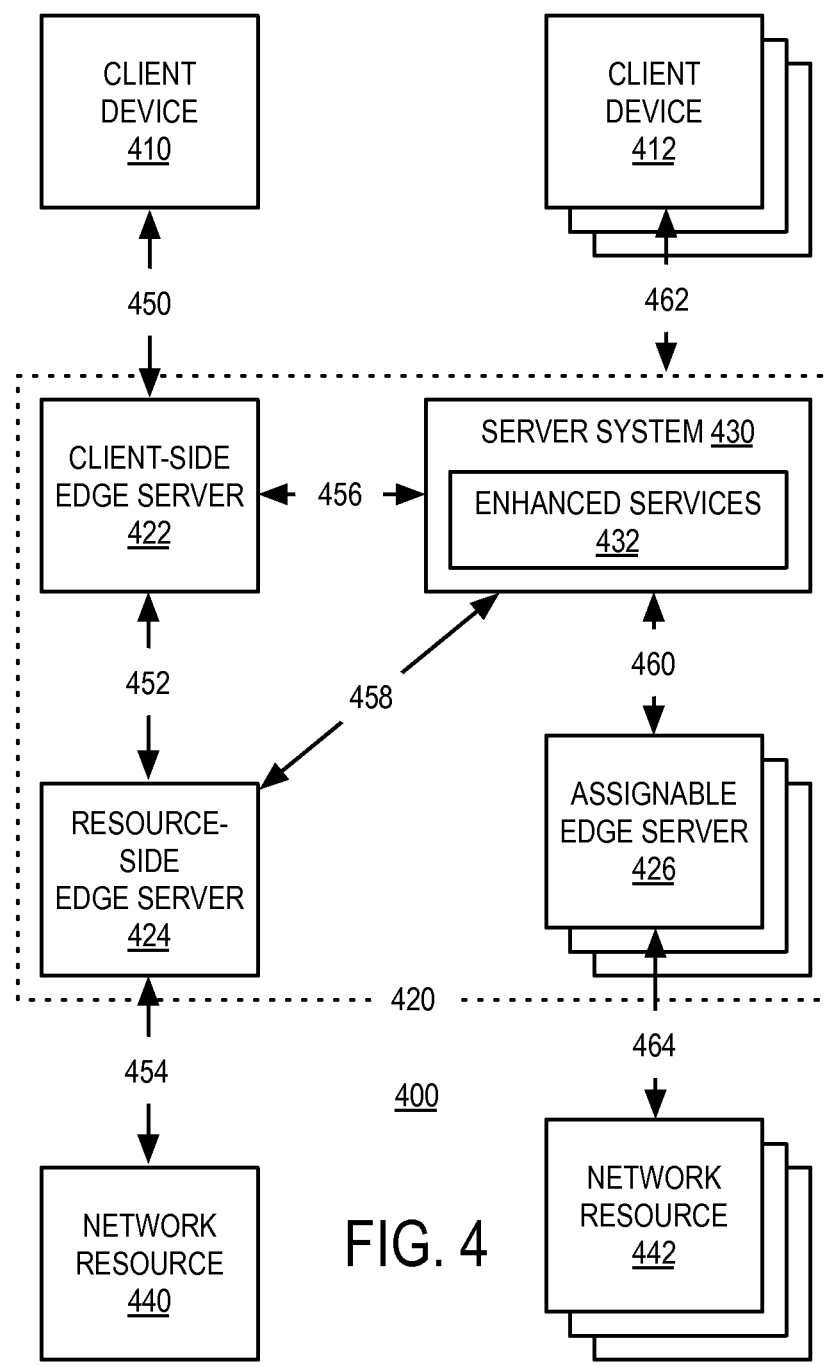
FIG. 4 is a schematic diagram depicting a third view of an example computing system.

FIG. 4 a schematic diagram depicting an example computing system 400. Computing system 400 may take the form of a non-limiting example of previously described computing system 100 of FIG. 1 and/or computing system 200 of FIG. 2. Computing system 400 includes a client device 410 (a client) accessing a network resource 440 over a communications network via an enhanced services network 420. Client 410 may be one of a plurality of clients 412, and network resource 440 may be one of a plurality of network resources 442. As one example, client 410 may be a subscriber of enhanced services network 420, which provides enhanced services 432 to subscribers over an otherwise public communications network by which network resources 440/442 are operated by various third-party publishers and are accessible to both subscriber and non-subscriber clients.

Enhanced services network 420 may include a plurality of network devices, such as one or more servers. As one example, one or more available and assignable edge servers may be assigned to the client-side of the enhanced services network 420, such as example client-side edge server 422; and one or more edge servers may be assigned to the resource-side of the enhanced services network 420, such as example resource-side edge server 424. Edge servers 422 and 424 are members of a plurality of available and assignable edge servers 426. Enhanced services network may include one or more coordinating servers forming a server system 430. Server system 430 implements aspects of enhanced services 432. The servers forming server system 430 may include one or more dedicated coordinating servers and/or one or more edge servers that also operate as coordinating servers. Server system 430 may form a non-limiting example of previously described server system 240 of FIG. 2.

Enhanced services 432 may include the previously described assignment/selection of edge servers, and may further include other suitable services. Other non-limiting examples of enhanced services 432 supported by enhanced services network 420 include one or more of: (1) proxy services (e.g., anonymization) in which edge servers and/or other network devices of the enhanced services network terminate connections and establish new connections between the client device and third-party resources; (2) establishment of secure connections (e.g., VPN connections, encrypted connections, tunneled connections, etc.) between the client device, the enhanced services network, and/or server systems hosting network resources requested by the client; (3) secure connection (e.g., SSL) redirection or establishment to higher security connections supported by third-party resources than the connections originally requested by the client device (e.g., see method 600 of FIG. 6); (4) analysis and/or filtering of communications between the client device and third-party resources, including anti-virus, parental controls, etc.; (5) access to client profile information hosted by the enhanced services network that may be used to implement policy with respect to a particular user and/or client device across an individual session or multiple sessions; and (6) client authentication, among other enhanced services.

A client-side edge server forms an edge of the enhanced services network in relation to one or more clients, and may additionally form a resource-side edge server in relation to one or more network resources for one or more other clients. A resource-side edge server forms an edge of the enhanced services network in relation to one or more network resources for one or more client devices requesting those network resources, and may additionally form a client-side edge server in relation to one or more other client devices. In some implementations, an edge server may operate as either a client-side edge server or a resource-side edge server. In other implementations, an edge server may operate as both a client-side edge server and a resource-side edge server.

Communications between clients and server systems hosting network resources may traverse one or more of a client-side edge server and a server-side edge server of the enhanced services network. In FIG. 4, for example, communications originating from client 410 are received at client-side edge server 422 over a communications network as indicated at 450. Communications received at client-side edge server 422 or other node of enhanced services network 420 may be terminated, inspected, processed, re-written, and/or forwarded or transmitted by client-side edge server 422 over the communications network to another node of enhanced services network 420. This node may include a resource-side edge server (e.g., resource-side edge server 424) or other suitable network device of enhanced services network 420, such as one or more servers of server system 430.

Communications initiated at client 410 are subsequently received at resource-side edge server 424 over the communications network as indicated at 452, for example, after traversing client-side edge server 422 and potentially one or more other nodes of enhanced services network 420. Communication paths 456 and 458 depict example communications between edge servers and server system 430. Communication path 460 depicts example communications between server system 430 and assignable edge servers 426, for example, to communicate edge server assignment information. It will be understood that the enhanced services network may include any suitable number of assignable edge servers, including tens, hundreds, thousands, millions, or more edge servers.

Communications received at resource-side edge server 424 may be may be terminated, inspected, processed, re-written, and/or forwarded or transmitted by resource-side edge server 424 over the communications network, as indicated at 454, to a server system hosting network resource 440. The server system hosting the network resource receives communications transmitted by resource-side edge server 424 over the communications network, as indicated at 454.

The communication flow from a servers system hosting a network resource directed at a client may follow the reverse path. FIG. 4 further depicts how other clients (e.g., one or more of clients 412 may communicate with other network resources (e.g., one or more of network resources 442) via the enhanced services network, as indicated at 462 and 464, for example. However, in some examples, communications between clients and server systems hosting network resources may bypass enhanced services network 420.

It will be understood that communications between the client, the client-side edge server, the resource-side edge server, and the server system hosting the network resource may traverse one or more intermediate network devices along one or more of paths 450, 452, 454, 456, 458, etc. At least some of these intermediate network devices may be owned or operated by a different entity than the entity that owns or operates the enhanced services network. For example, the enhanced services network may be operated by a common entity or a group of associated entities, in contrast to server systems hosting network resources and/or intermediate network devices (not shown) that may be operated by unrelated or unaffiliated third-party entities.

A network resource, such as example network resource 440, may be hosted at one or more server devices of a server system. Separate instances of the network resource may be hosted at two or more servers of a server system. A network resource may be distributed across two or more server devices of a server system. A server system may take the form of a geographically co-located server farm containing two or more geographically co-located servers, and/or a geographically distributed server farm containing two or more geographically distributed servers. A server system may include one or more network devices that balance communication loads and/or distribute communications across or among numerous servers of the server system. Other network resources, such as one or more of network resources 442, may be hosted at one or more other server devices of one or more other server systems.

Network resources may be addressable by, reside at, and distinguished from each other by a network address, such as an IP address, uniform resource locator (URL) (e.g., web address), URI, or other suitable network address or identifier. Within some communication networks, such as the Internet, for example, network resources may be organized according to a domain and subdomain hierarchy in which a subdomain of network resources, under the control of an individual entity, take the form of extensions to a higher level domain address. In the context of the Internet, for example, a port is associated with an IP address of a host. A port number or identifier in combination with an IP address of a host defines the destination address for a communications session. As one example, an HTTP connection with a server system hosting a network resource is typically supported on port 80 of the server system, while an HTTPS connection used for the TLS/SSL protocol is typically supported on port 443 of the server system. However, different port assignments may be used. A domain name service (DNS) accessible via the Internet may be referenced to translate between IP addresses and domain names. It will be understood that an individual network resource residing at a particular URL may be associated with two or more IP addresses if two or more instances of the network resource are hosted by different servers.

Figure 5:
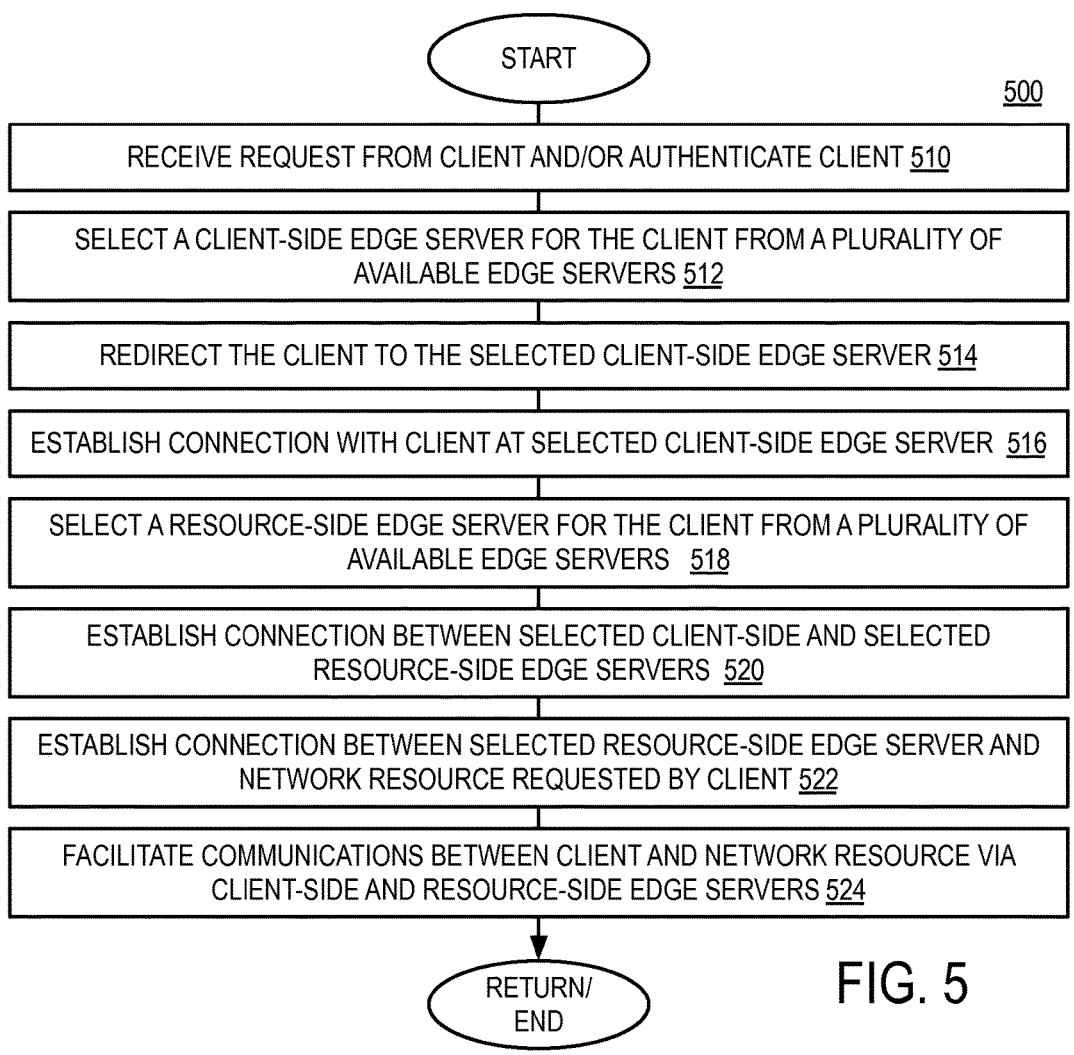
FIG. 5 is a flow diagram depicting a second example method.

FIG. 5 is a flow diagram depicting an example method 500 of using edge servers of an enhanced services network to facilitate network communications between a client and a server system hosting a network resource. As one example, method 500 may be performed by one or more servers, such as one or more of the servers of enhanced services network 420 of FIG. 4. The one or more servers may take the form of edge servers and/or coordinating servers.

At 510, the method may include receiving a request initiated by a client and/or authenticating the client. As one example, the client may initiate a request for a network resource. The request may indicate a network address of the network resource and/or a connection type to be established with the server system hosting the network resource. A connection type may be indicated by a request to a particular port of the server system. For example, a request to port 80 of the server system may indicate a request for an HTTP connection, while a request to port 443 of the server system may indicate a request for an HTTPS connection.

The client may direct the request to the enhanced services network rather than to the server system hosting the requested network resource, and the enhanced services network processes the request on behalf of the client. In at least some implementations, an initial entry node of the enhanced services network may include a dedicated web portal hosted at one or more servers of the enhanced services network. These one or more servers may be dedicated web portal servers, dedicated coordinating servers, dedicated edge servers, or multi-function servers. In another implementation, the initial entry node for an individual client may be the last client-side edge server used by the client, a selected edge server of a number of client-side edge servers previously used by the client, or a server that is selected by the client from a predefined list of available client-side edge servers of the enhanced services network.

Access to the enhanced services network and its enhanced services may be limited to authenticated clients in some implementations. Clients and/or their users may subscribe to the enhanced services network, and may be issued authentication credentials by the enhanced services network as part of the subscription. Authentication credentials may include one or more of a username, password, or other suitable form of credentials. If a session has not yet been established by the client, authentication of the client may include receiving authentication credentials from the client at a server of the enhanced services network, and authenticating the client prior to processing the client's request for a network resource. If a session has already been established by a client, the enhanced services network may authenticate the client by validating a state object previously deployed to the client following a previous authentication at the beginning of that session. It will be understood that other suitable forms of authentication may be used.

At 512, the method may include selecting a client-side edge server for the client. In at least some implementations, selection of the client-side edge server may be performed by one or more coordinating servers of the enhanced services network. The selection of client-side edge servers may be in accordance with a rule set that includes one or more rules. A non-limiting example of a selection process for a client-side edge server is described in U.S. Provisional Patent Application 61/773,351 incorporated herein by reference in its entirety. The selection described in this document and as described with reference to FIGS. 1-3 of the present disclosure, may seek to minimize or reduce discoverability of the client-side edge servers of the enhanced services network by limiting the extent to which a particular user, client, or domain of clients interact is able to access or interact with the domain of available edge servers of the enhanced services network. For example, a particular user, client, or domain of clients may be limited to interaction with a threshold proportion or quantity of the domain of available edge servers. However, other suitable client-side edge server selection techniques may be used.

At 514, the method may include redirecting the client to the selected client-side edge server. The client may be redirected by and from the entry node of the enhanced services network to the selected client-side edge server. For example, the client request may be received at a first server of the enhanced services network and/or authenticated at the first server, and then may be redirected to the selected client-side edge server. Operation 514 may not be performed, for example, if the entry node of the enhanced services network used by the client is the same as the selected client-side edge server.

At 516, the method may include establishing a connection with a client at the selected client-side edge server. The client, redirected at 514, may transmit a request directed to the client-side edge server that is received at the client-side edge server. The request may indicate a requested network resource and/or a requested connection type for the network resource. The client-side edge server may authenticate the client using information obtained from the client and/or information received from another node of the enhanced services network prior to processing the request. In some examples, the connection established between the client and the client-side edge server may take the form of a secure connection, such as an HTTPS connection using TLS/SSL protocol. However, other suitable secure connections may be used. The use of a secure connection between the client and an edge of the enhanced services network may form a VPN connection, and communications between or among nodes of the enhanced services network may maintained the secure connection or may used other forms of secure connections.

At 518, the method may include selecting a resource-side edge server for the client from a plurality of available edge servers. Operation 518 may be performed by one or more servers of the enhanced services network. The selection of the resource-side edge server may be in accordance with a rule set that includes one or more rules. This rule set may differ from the rule set used to select a client-side edge server, or may be integrated with that rule set. An example rule of the rule set used for resource-side edge server selection may seek to minimize or reduce a geographic distance and/or network distance between the selected resource-side edge server and a server system hosting an instance of the requested network resource. The network distance may be with reference to network latency, round-trip time, and/or the number of intermediate network devices located between the resource-side edge server and a server hosting an instance of the network resource. The enhanced services network may use testing to obtain data concerning network latency, round-trip time, and/or the identity and/or quantity of intermediate network devices. Another example rule of the rule set may include limiting use of the resource-side edge server with respect to one or more network entities, including a client, a domain of clients, a network resource, a domain of network resources, or a server system hosting those network resources. For example, the techniques previously described with reference to client-side edge server selection may be applied to resource-side edge server selection to minimize or reduce discoverability of resource-side edge servers by network entities, such as server systems hosting network resources, particularly if those network resources experience large traffic loads from subscribers of the enhanced services network. In such case, a server system hosting a particular network resource may obtain requests for the network resource from a limited subset (e.g., threshold proportion or quantity) of the edge servers of the enhanced services network. Resource-side edge server selection may also be based on one or more performance criteria associated with the available edge servers, including their respective server loads, for example.

At 520, the method may include establishing a connection between selected client-side and selected resource-side edge servers. As one example, a coordinating server of the enhanced services network may send information to the client-side edge server that enables the client-side edge server to establish a connection with the resource-side edge server, or vice-versa. As another example, the client-side edge server may establish a connection to a coordinating server of the enhanced services network, which in turn establishes a connection to the resource-side edge server or redirects the client-side edge server to the resource-side edge server.

At 522, the method may include establishing a connection between the selected resource-side edge server and the network resource requested by the client. The connection requested and established by the selected resource-side edge server may be the same connection type requested by the client, or may include a more secure connection type, as will be discussed in greater detail with reference to method 600 of FIG. 6.

At 524, the method may include facilitating communications between the client and the network resource via the client-side and resource-side edge servers. A communication link between the client and the network resource may include communications traversing the client-side edge server, potentially one or more other nodes of the enhanced services network, and a resource-side edge server. Client requests to the server system hosting the network resource and responses by the server system responsive to those requests may traverse the client-side and resource-side edge servers of the enhanced services network.

Method 500 may be implemented to establish a secure connection between a client and the enhanced services network, and/or within the enhanced services network up to at least the resource-side edge server. Operation 518 may be performed by the enhanced services network to minimize or reduce perceived security threats to communications traversing public networks between the resource-side edge server and the server system hosting the requested network resource. The communications link between the edge of the enhanced services network and server system hosts may include numerous intermediate devices operated by unaffiliated third-parties. Hence, minimizing or reducing the geographic and/or network distance between the edge of the enhanced services network and the server system hosts, and/or the number of intermediate devices (or even the type or identity of the intermediate devices) may serve to minimize or reduce the risk that communications traversing the public networks may be intercepted or compromised. Method 600 of FIG. 6 describes a technique for increasing the security of communications traversing public networks between the resource-side edge servers of the enhanced services network and server system hosts.

Figure 6:
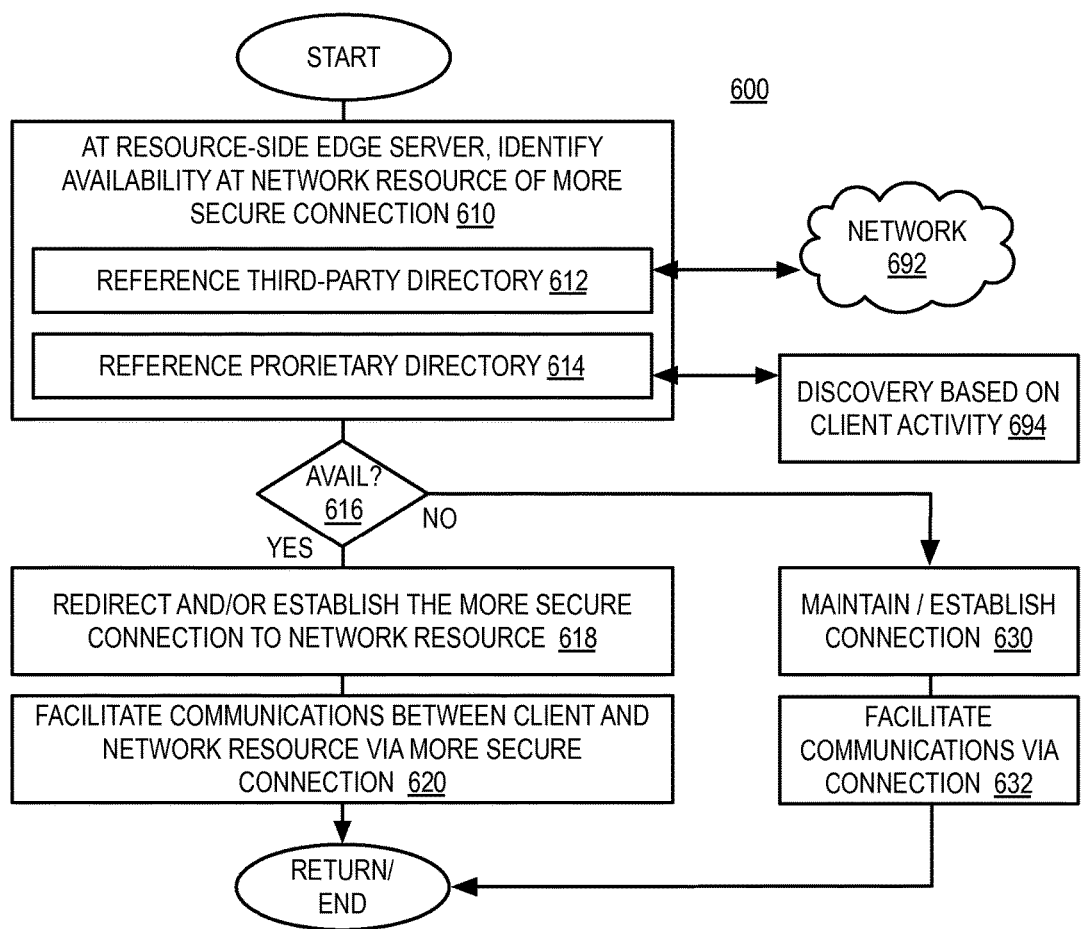
FIG. 6 is a flow diagram depicting a third example method.

FIG. 6 is a flow diagram depicting an example method 600 of redirection to a more secure connection by an enhanced services network. In at least some implementations, method 600 of FIG. 6 may be used in combination with method 500 of FIG. 5 or portions thereof. However, method 500 of FIG. 5 may be used independently of method 600 of FIG. 6, and may be used in computing systems that differ from example computing system 400 of FIG. 4.

At 610, the method may include identifying availability of a more secure connection at a network resource. Operation 610 may be performed by one or more servers of the enhanced services network. As one example, operation 610 may be performed by a resource-side edge server. Alternatively or additionally, operation 610 may be performed by a coordinating server of the enhanced services network or with cooperation between a coordinating server and the resource-side edge server.

The availability of a more secure connection may be identified by one or more of: (1) referencing a third-party and/or public directory 692 as indicated at 612, (2) referencing a proprietary directory maintained by the enhanced services network at 614, and/or (3) testing by the enhanced services network. The propriety directory and/or testing may rely on discovery of supported connection types at server system hosts by the enhanced services network based on past and/or current client activity or programmatic testing. Client activity may include activity of the requesting client and/or other clients of the enhanced services network. For example, enhanced services network may record available and/or supported connection types in a database responsive to one or more of its clients requesting and successfully establishing a connection with a server system. Alternatively or additionally, the enhanced services network may perform testing by requesting and attempting to establish secure connections with server system hosts. A database maintained by the enhanced services network may include an entry for the identity of the network resource and/or server system (e.g., IP address and/or URL), an entry for the port number requested, and the connection type established on that port with the server system.

If a more secure connection is judged or otherwise determined to be available at 616, the process flow may proceed to 618. Alternatively, if the more secure connection is judged or otherwise determined not to be available at 616, the process flow may instead proceed to 630.

At 618, the method may include redirecting and/or establishing the more secure connection to the network resource. A more secure connection may be established by the enhanced services network in a variety of ways. The following examples are described in the context of establishing an HTTPS connection on port 443 responsive to a request from a client for an HTTP connection on port 80 of a server system hosting a network resource.

As one example, a client's request for an HTTP connection on port 80 of a server system hosting the network resource may be intercepted, inspected, and rewritten by the enhanced services network to a request for an HTTPS connection on port 443 of the server system, which may be forwarded by the enhanced services network to the server system via the resource-side edge server. As another example, the enhanced services network may send a redirect message to the client that directs the client to initiate a subsequent request for a connection on port 443 of the server system hosting the network resource. As yet another example, a server of the enhanced services network may receive and terminate the client's request for an HTTP connection on port 80 of the server system, and initiate a new request on-behalf of the client to the server system for an HTTPS connection on port 443.

Other suitable techniques may be used to establish a more secure connection. For example, some server systems may support HTTPS or other secure connection type on port 80 or other suitable port. In this case, a request message may be transmitted to the server system that requests the server system to switch to a more secure connection using a protocol specific mechanism (e.g., STARTTLS for mail and news protocols).

In a scenario where a connection has not yet been established for the client with a server system hosting the network resource, the resource-side edge server establishes a connection to a port of the server system that supports the more secure connection. In a scenario where a connection has already been established to the network resource for the client with a server system hosting the network resource, the resource-side edge server may redirect the client or otherwise transition the client to a more secure connection. In at least some implementations, this transition may be performed by the enhanced services network responsive to a client navigating to a different network resource of the same domain or of a different domain, and/or responsive to a client navigating to a different server system.

At 620, the method may include facilitating communications between the client and the network resource via the more secure connection. A communication link between the client and the network resource may include communications traversing the client-side edge server, potentially one or more other nodes of the enhanced services network, and the resource-side edge server. Client requests to the server system hosting the network resource and responses by the server system responsive to those requests may traverse the client-side and resource-side edge servers of the enhanced services network over secure connections.

At 630, the method may include maintaining and/or establishing the requested connection with the network resource. If a connection to the network resource has not yet been established for the client, the resource-side edge server establishes a connection with the server system hosting the network resource on a port that supports the requested connection. If the requested connection to the network resource has already been established for the client, the resource-side edge server maintains the connection with the server system hosting the network resource.

At 632, the method may include facilitating communications between the client and the network resource via the requested connection. A communication link between the client and the network resource may include communications traversing the resource-side edge server and potentially one or more other intermediate nodes of the enhanced services network. Client requests to the server system hosting the network resource and responses by the server system responsive to those requests may traverse the resource-side edge server and potentially one or more other intermediate nodes of the enhanced services network.

It will be understood that aspects of method 200 may be performed responsive to determinations made by the enhanced services network in method 600, and vice-versa. For example, techniques of method 200 seeking to minimize or reduce geographic and/or network proximity between resource-side edge servers and server system hosts may be weighted more heavily if the server system hosts do not support a more secure connection (or a connection of a particular type) than requested by the client. Conversely, techniques of method 200 seeking to minimize or reduce geographic and/or network proximity between resource-side edge servers and server system hosts may be weighted less heavily or omitted if the server system hosts support a more secure connection (or a connection of a particular type). Hence, in at least some implementations, resource-side edge server selection may be based, at least in part, on the connection types supported by the server system requested by the client, and/or the connection type requested by the enhanced services network on behalf of the client may be based, at least in part, on the network location of the selected resource-side edge server in relation to the requested server system.

Figure 7:
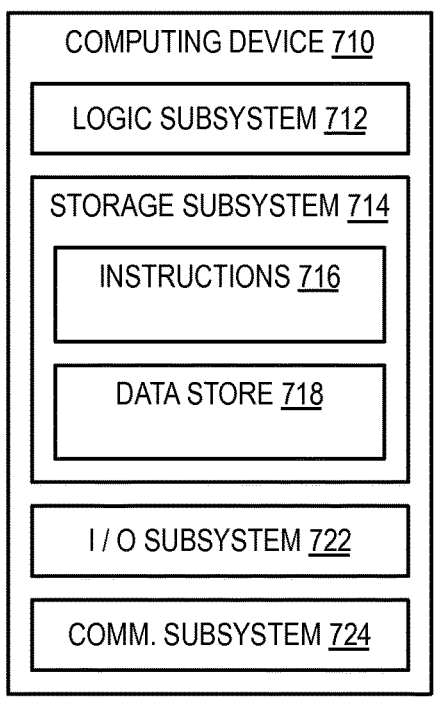
FIG. 7 is a schematic diagram depicting an example computing device.

FIG. 7 is a schematic diagram depicting an example computing device 700. Computing device 700 is a non-limiting example of the various client devices, server devices, and server systems described herein. In the context of a client device, for example, computing device 700 may take the form of a smartphone, tablet computer, laptop or notebook computer, desktop computer, mobile computer, gaming console, network enabled household device, wearable device, or other suitable computing device.

Computing device 700 includes a logic subsystem 712. Logic subsystem 712 includes one or more physical processors, logic machines, logic elements, and/or other suitable logic devices. During operation, logic subsystem 712 may execute instructions, such as instructions 716 stored in storage subsystem 714 to perform one or more of the example methods, operations, processes, or tasks described herein. Instructions 716 may include or take the form of software and/or firmware. Examples of software include an operating system, an application program, a plug-in, a software update, a software portion, combinations thereof, or other suitable instruction set. Instructions 716 are executable by one or more computing devices, such as by example logic subsystem 712. Instructions may be programmed or coded using any suitable programming language or combination of programming languages. Storage subsystem 714 includes one or more physical memory devices, hard drives, peripheral storage devices accessible to the computing device, or other suitable forms of computer-readable information storage devices. Storage subsystem 714 may include a data store 718 within which information may be stored and/or from which information may be retrieved.

Computing system 700 may include an input/output subsystem 722 that includes or otherwise interfaces with one or more input devices and/or output devices. Examples of input devices include a touch-screen display, a keyboard or keypad, a pointing device such as a mouse or a controller, a microphone, and/or optical sensor(s), among other suitable input devices. Examples of output devices include a graphical display, a touch-screen display, an audio speaker, and/or a haptic feedback device (e.g., a vibration motor), among other suitable output devices.

Computing device 700 may include a communications subsystem 724 that supports wired and/or wireless communications with a communications network. Communications subsystem 724 may include one or more transceivers, transmitters, receivers, filters, amplifiers, and/or other suitable electronic devices. Communications subsystem 724 may support any suitable communications protocol. Example communications protocols include wireless protocols such as 3G (e.g., UMTS, etc.), 4G (e.g., LTE, Wi-Max, etc.), Wi-Fi, Bluetooth, etc. as well as wired TCP/IP protocols, among others.

Figure 8:
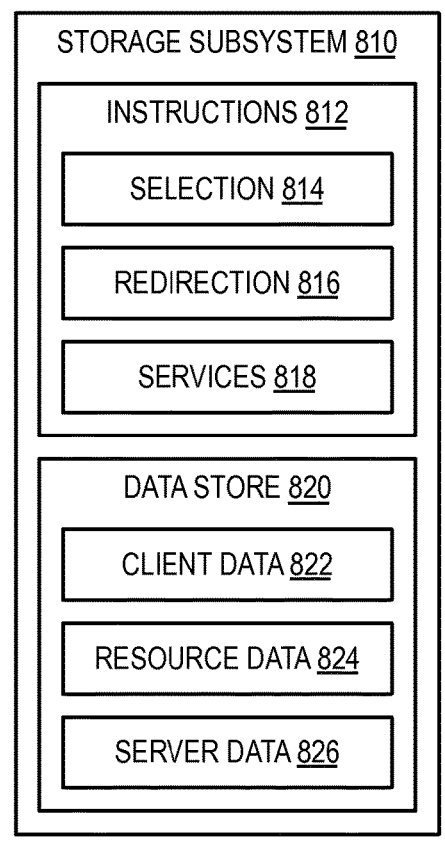
FIG. 8 is a schematic diagram depicting example instructions and data store of a computing device or computing system.

FIG. 8 is a schematic diagram depicting an example storage subsystem 810 of one or more computing devices of an enhanced services network. Storage subsystem 810 includes instructions 812 stored therein. Instructions 812 may include one or more of a selection module 814, redirection module 816, and/or services module 818. Selection module 814 may be configured to select client-side edge servers and/or resource-side edge servers, and may implement aspects of method 200, including operations 212 and/or 218. Redirection module 816 may be configured to redirect and/or establish connections, and may implement aspects of method 200, including operations 214, 216, 220, and/or 222. Services module 818 may be configured to provide the other enhanced services described herein, and may be configured to perform testing and/or logging of server system hosts and the connection types that they support. Storage subsystem 810 further includes data store 820, which may include one or more of client data 822, resource data 824, and/or server data 826. Client data 822 may include user and/or client account data and/or histories (e.g., connection types, network resources requested, etc.). In one example, client account data may include one or more values defining client-selected settings. The client-selected settings may indicate, for example, which target goals are to be implemented and/or emphasized by a rule set of the enhanced services network. Resource data 824 may include identities of server system hosts and/or their respective resources along with indications of the connection types supported by these server systems. Server data 826 may include information concerning the various servers of the enhanced services network, including the assignment of client-side and/or resource-side edge server identity/status, coordinating server identity/status, etc. In one example, server data may include one or more values defining administrator-selected settings for the enhanced services network. As one example, the administrator-selected settings may indicate which target goals are to be implemented and/or emphasized by a rule set of the enhanced services network.

It will be understood that the embodiments, implementations, and scenarios described by way of example herein are illustrative and not restrictive. The scope of the invention or inventions is defined by the claims, now or later presented, rather than by these examples. All changes that fall within the metes and bounds of the claims, and the equivalence of such metes and bounds are embraced by the claims.

The invention claimed is:

1. A method performed by a computing system implementing an enhanced services network, the method comprising:
   authenticating a client at one or more coordinating servers of a server system for one or more sessions of the client for the enhanced services network based on authentication information received from the client over a communications network;
   maintaining a client-specific group of client-side edge servers available to the client across all sessions of the client for the enhanced services network in which the client-specific group of client-side edge servers is a limited subset of a domain of client-side edge servers of the enhanced services network, the client-specific group of client-side edge servers including a predefined quantity or proportion of the domain of client-side edge servers;
   following a first authentication of the client for a session of the enhanced services network of the one or more sessions, directing a browser program of the client to establish a connection to a first client-side edge server of the client-specific group, the first client-side edge server facilitating, via a first set of one or more resource-side edge servers of the enhanced services network, at least a portion of the session between the client and one or more third-party network resources hosted by one or more third-party servers located outside of the enhanced services network by:
      receiving, from the client, a first request initiated via the browser program for the one or more third-party network resources, establishing a virtual private network with the first set of one or more resource-side edge servers located along a communications path to the one or more third-party network resources, and processing the first request on-behalf of the client via the first client-side edge server and the first set of one or more resource-side edge servers; and
   following a second authentication of the client for a subsequent session of the enhanced services network of the one or more sessions, directing the browser program of the client to establish a connection to a second client-side edge server of the client-specific group, the second client-side edge server facilitating, via a second set of one or more resource-side edge servers of the enhanced services network that differs from the first set, at least a portion of the subsequent session between the client and one or more third-party network resources hosted by one or more third-party servers located outside of the enhanced services network by:
      receiving, from the client, a second request initiated via the browser program for the one or more third-party network resources, establishing a virtual private network with the second set of one or more resource-side edge servers located along a communications path to the one or more third-party network resources hosted by the one or more third-party servers, and processing the second request on-behalf of the client via the second client-side edge server and the second set of one or more resource-side edge servers.

2. The method of claim 1, further comprising:
   redirecting the client from the first client-side edge server to the second client-side edge server or a third client-side edge server of the client-specific group during the session, the second client-side edge server or third client-side edge server further facilitating the session between the client and the one or more third-party network resources.

3. The method of claim 1, wherein the client is a first client of a plurality of clients, and wherein the client-specific group is a first client-specific group of a plurality of client-specific groups, the method further comprising:
   authenticating a second client at the server system for one or more sessions based on authentication information received from the second client over the communications network;
   maintaining a second client-specific group of client-side edge servers available to the second client over the one or more sessions of the domain of client-side edge servers, the second client-specific group of client-side edge servers including the predefined quantity or proportion of the domain of edge servers, and further including one or more different client-side edge servers than the first client-specific group.

4. The method of claim 3, wherein the first client and the second client are located within a geographic proximity to each other or each utilize an IP address that is related within a subdomain of IP addresses.

5. The method of claim 4, further comprising:
   authenticating a third client at the server system for one or more sessions based on authentication information received from the third client over the communications network;
   maintaining a third client-specific group of client-side edge servers available to the third client over the one or more sessions of the domain of client-side edge servers, the third client-specific group of client-side edge servers including the predefined quantity or proportion of the domain of client-side edge servers, and further including one or more different client-side edge servers than at least one of the first client-specific group and/or the second client-specific group.

6. The method of claim 5, wherein the third-client specific group includes the same client-side edge servers as one of the first client-specific group or the second client specific group if the third client is located outside of the geographic proximity to one of the first client or second client or utilizes an IP address that is unrelated to the subdomain of IP addresses.

7. The method of claim 1, wherein the domain of client-side edge servers is divided into three or more groups of client-side edge servers of which the client-specific group is a first group of the three or more groups, and wherein the three or more groups of client-side edge servers each include one or more different client-side edge servers relative to each other.

8. The method of claim 7, wherein the three or more groups of client-side edge servers each include one or more of the same client-side edge servers relative to each other.

9. The method of claim 1, further comprising:
   transmitting selection information from the server system to the first client-side edge server and the second client-side edge server of the group, the selection information indicating a client identifier for the client, and further indicating at least some client-side edge servers of the client-specific group of client-side edge servers for the client;
   wherein the selection information enables the first client-side edge server and the second client-side edge server to redirect the client from one of the first client-side edge server and the second client-side edge server to another client-side edge server of the client-specific group during a session.

10. The method of claim 1, wherein the first client-side edge server and the second client-side edge server facilitate at least the portion of the session and the subsequent session, respectively, between the client and the one or more third-party network resources by providing a proxy service for the client that terminates connections and establishes new connections between the client and the one or more third-party network resources hosted by one or more third-party servers.

11. The method of claim 1, wherein the first client-side edge server and the second client-side edge server facilitate at least the portion of the session and the subsequent session, respectively, between the client and the one or more third-party network resources by increasing a level of encryption along a communications path between the client device and the one or more third-party network resources hosted by one or more third-party servers.

12. The method of claim 4, further comprising:
selecting the first client-specific group of client-side edge servers based on a geographic location or IP address of the first client, wherein the first client-specific group of client-side edge servers is selected to minimize or reduce the geographic and/or network distance between the first client-specific group of client-side edge servers and the first client; and
selecting the second client-specific group of client-side edge servers based on a geographic location or IP address of the second client, and further based on the first client-specific group of client-side edge servers, wherein the second client-specific group of client-side edge servers is selected to minimize or reduce the geographic and/or network distance between the second client-specific group of client-side edge servers and the second client, while also maintaining one or more different client-side edge servers in the second client-specific group than the first client-specific group.

13. The method of claim 1, further comprising:
receiving communications from client-side edge servers of the domain of client-side edge servers that were initiated by authenticated clients; and
establishing and/or redirecting the communications to a more secure connection with target network resources hosted by third-party servers on behalf of the authenticated clients.

14. A computing system, comprising:
one or more computer-readable information storage devices having instructions stored thereon, executable by one or more computing devices to:
authenticate a first client for one or more sessions of an enhanced services network based on authentication information received from the first client over a communications network;
select a first client-specific group of client-side edge servers of a domain of client-side edge servers of the enhanced services network that are available to the first client over all sessions of the enhanced services network, the first client-specific group of client-side edge servers including a predefined quantity or proportion forming a first limited subset of the domain of client-side edge servers;
following a first authentication of the first client for a session of the enhanced services network, facilitate, via a first set of one or more resource-side edge servers of the enhanced services network, at least a portion of the session between the first client and one or more third-party network resources hosted by one or more third-party servers located outside of the enhanced services network by:
establishing a virtual private network with the first set of one or more resource-side edge servers located along a communications path to the one or more third-party network resources, providing a proxy service for the first client that terminates connections and establishes new connections between the first client device and the one or more third-party network resources hosted by one or more third-party servers via the first client-side edge server and the first set of one or more resource-side edge servers; and
following a second authentication of the first client for a subsequent session of the enhanced services network, facilitate, via a second set of one or more resource-side edge servers of the enhanced services network that differs from the first set, at least a portion of the subsequent session between the first client and one or more third-party network resources hosted by one or more third-party servers located outside of the enhanced services network by:
establishing a virtual private network with the second set of one or more resource-side edge servers located along a communications path to the one or more third-party network resources, providing the proxy service for the first client that terminates connections and establishes new connections between the first client device and the one or more third-party network resources hosted by one or more third-party servers via the second client-side edge server and the second set of one or more resource-side edge servers.

15. The computing system of claim 14, where the instructions are further executable by the one or more computing devices to:
authenticate a second client for one or more sessions based on authentication information received from the second client over a communications network;
select a second client-specific group of client-side edge servers available to the second client over the one or more sessions of the domain of client-side edge servers, the second client-specific group of client-side edge servers including a predefined quantity or proportion forming a second subset of the domain of client-side edge servers, the second subset including one or more different client-side edge servers than the first subset;
following a first authentication of the second client for a session of the one or more sessions, facilitate at least a portion of the session between the second client and one or more third-party network resources by providing the proxy service for the second client that terminates connections and establishes new connections between the second client device and the one or more network resources hosted by one or more third-party servers; and
following a second authentication of the second client for a subsequent session of the one or more sessions, directing the second client to a second client-side edge server of the second client-specific group, the second client-side edge server facilitating at least a portion of the subsequent session between the second client and one or more third-party network resources by providing the proxy service for the second client that terminates connections and establishes new connections between the second client device and the one or more third-party network resources hosted by one or more third-party servers.

16. The computing system of claim 14, where the instructions are further executable by the one or more computing devices to:
- to receive communications from client-side edge servers of the domain of client-side edge servers that were initiated by authenticated clients; and
- establish and/or direct the communications to a more secure connection with target network resources hosted by third-party servers on behalf of the authenticated clients.

\* \* \* \* \*